United States Patent
Yamasaki

(10) Patent No.: US 11,099,541 B2
(45) Date of Patent: *Aug. 24, 2021

(54) MOTOR CONTROL DEVICE FOR PERFORMING AN AXIAL FEED CONTROL METHOD

(71) Applicant: FANUC CORPORATION, Yamanashi (JP)

(72) Inventor: Mizuho Yamasaki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 148 days.

This patent is subject to a terminal disclaimer.

(21) Appl. No.: 16/541,792

(22) Filed: Aug. 15, 2019

(65) Prior Publication Data
US 2020/0064808 A1 Feb. 27, 2020

(30) Foreign Application Priority Data
Aug. 22, 2018 (JP) .............................. JP2018-155593

(51) Int. Cl.
*G05B 19/402* (2006.01)

(52) U.S. Cl.
CPC .. *G05B 19/402* (2013.01); *G05B 2219/33263* (2013.01)

(58) Field of Classification Search
CPC .... G05B 19/402; G05B 19/408; G05B 19/41; G05B 19/4155; G05B 2219/33263; G05B 19/409; B23H 7/26
USPC ........................................................ 700/170
See application file for complete search history.

(56) References Cited

U.S. PATENT DOCUMENTS

| 6,233,497 | B1* | 5/2001 | Kachi | ........................ | B24B 5/14 |
| | | | | | 451/9 |
| 6,549,824 | B1* | 4/2003 | Satou | ............... | G05B 19/41875 |
| | | | | | 700/162 |
| 2005/0115928 | A1 | 6/2005 | Arakawa et al. | | |
| 2014/0306993 | A1* | 10/2014 | Poulos | .................. | G06T 19/006 |
| | | | | | 345/633 |
| 2015/0234373 | A1* | 8/2015 | Myers | ................... | G05B 19/409 |
| | | | | | 700/170 |
| 2020/0064807 | A1* | 2/2020 | Yamasaki | .............. | G05B 19/41 |

FOREIGN PATENT DOCUMENTS

| CN | 104035379 B | 1/2017 |
| JP | H05282047 A | 10/1993 |
| JP | H06102922 A | 4/1994 |
| JP | H07251350 A | 10/1995 |
| JP | 2005-153128 A | 6/2005 |
| JP | 2013097413 A | 5/2013 |

* cited by examiner

*Primary Examiner* — Chun Cao
(74) *Attorney, Agent, or Firm* — Robert P. Michal, Esq.; Carter, DeLuca & Farrell LLP

(57) ABSTRACT

A control device includes: an input unit; a motor driving control unit; an amount-of-movement detecting unit; a coordinate position detecting unit; a display unit; and a rounding processing unit configured to, during an axial feed operation, repeatedly perform rounding processing for rounding to a rounding place at least one of the coordinate position and the amount of movement of an object to be moved. The motor driving control unit drives motors, after the axial feed operation has been stopped, based on the result of the rounding processing that was performed last.

14 Claims, 6 Drawing Sheets

FIG. 6

| AXIAL FEED RATE | CORRESPONDING ROUNDING PLACE |
|---|---|
| "SUPERHIGH" | THE ONES PLACE |
| "HIGH" | THE TENTHS PLACE |
| "INTERMEDIATE" | THE HUNDREDTHS PLACE |
| "LOW" | THE THOUSANDTHS PLACE |
| "SLOW" | THE TEN-THOUSANDTHS PLACE |

# MOTOR CONTROL DEVICE FOR PERFORMING AN AXIAL FEED CONTROL METHOD

CROSS-REFERENCE TO RELATED APPLICATION

This application is based upon and claims the benefit of priority from Japanese Patent Application No. 2018-155593 filed on Aug. 22, 2018, the contents of which are incorporated herein by reference.

BACKGROUND OF THE INVENTION

Field of the Invention

The present invention relates to a control device and an axial feed control method for controlling a motor in a machine tool in which axial feed of an object to be moved is performed by the driving of the motor.

Description of the Related Art

"Continuous axial feed" (also called "jog feed (manual continuous feed)") is known as a method for axial feeding in machine tools etc. As a machine tool adopting this method, for example, a wire electric discharge machine is described in Japanese Laid-Open Patent Publication No. 2005-153128.

In the continuous axial feed, the motor for axial feed of an object to be moved (also referred to as a moved object) is driven based on the designation of an axial feed rate and an axial feed operation performed by an operator from an input unit. As the motor is driven, the object to be moved advances on a coordinate system at the designated rate along the axial feed direction until the axial feed operation is stopped. In this case, the operator performs the axial feed operation while monitoring the coordinate position and the amount of movement of the moved object displayed on a display unit.

SUMMARY OF THE INVENTION

However, when the operator intends to move the object to a desired position, the timing that the operator stops the axial feed operation (i.e., releases the operation key) may vary. This causes variation of the position at which the object stops. Particularly, there is a tendency that the error between the desired stopping position and the actual stopping position is larger when the axial feed rate is faster.

Accordingly, an object of the present invention is to provide a control device and an axial feed control method in which variations in the stopping position and the amount of movement of an object to be moved that occur during an axial feed operation by an operator are automatically reduced after the axial feed operation.

According to a first aspect of the present invention, a control device configured to control a motor for performing axial feed of a moved object includes: an input unit configured to allow an operator to perform an axial feed operation and specify an axial feed rate; a motor driving control unit configured to drive the motor such that the moved object moves at the specified axial feed rate only while the axial feed operation is being performed by the operator; an amount-of-movement detecting unit configured to detect an amount of movement of the moved object in an axial feed direction; a coordinate position detecting unit configured to detect, based on the amount of movement, a coordinate position of the moved object in the axial feed direction on a predetermined coordinate system; a display unit configured to display at least the coordinate position; and a rounding processing unit configured to repeatedly perform rounding processing for rounding at least one of the coordinate position and the amount of movement of the moved object to a rounding place corresponding to the specified axial feed rate while the axial feed operation is being performed, wherein the motor driving control unit is further configured to, after the axial feed operation is stopped, drive the motor such that at least one of the coordinate position and the amount of movement of the moved object is rounded based on a result of the rounding processing that was performed last.

According to a second aspect of the present invention, an axial feed control method includes the steps of: setting either of a coordinate position and an amount of movement of a moved object as an object of rounding processing; in accordance with specifying of an axial feed rate and performing of an axial feed operation by an operator, driving a motor such that the moved object moves on a coordinate system at the specified axial feed rate; determining a rounding place corresponding to the axial feed rate based on a predetermined correspondence relation; during the axial feed operation, obtaining a numerical value of the object of the rounding processing; during the axial feed operation, repeatedly performing the rounding processing to calculate a rounded numerical value by rounding the numerical value of the object of the rounding processing to the rounding place; and after the axial feed operation is stopped, driving the motor such that an actual numerical value of the object of the rounding processing agrees with the rounded numerical value that was calculated last.

Thus, a rounded numerical value is repeatedly calculated during an axial feed operation and the motor is automatically controlled after the axial feed operation has been stopped, so as to achieve the coordinate position or the amount of movement indicated by the rounded numerical value. Variation in the stopping position and the amount of movement of the moved object occurring during the axial feed operation by the operator is thus automatically reduced after the axial feed operation.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a correspondence table showing an example of a relation between axial feed rates and rounding places that is stored in a memory of the control unit of the first embodiment.

DESCRIPTION OF THE PREFERRED EMBODIMENTS

The control device and axial feed control method according to the present invention will now be described in detail in conjunction with preferred embodiments while referring to the accompanying drawings.

Configuration of First Embodiment

Figure 1:
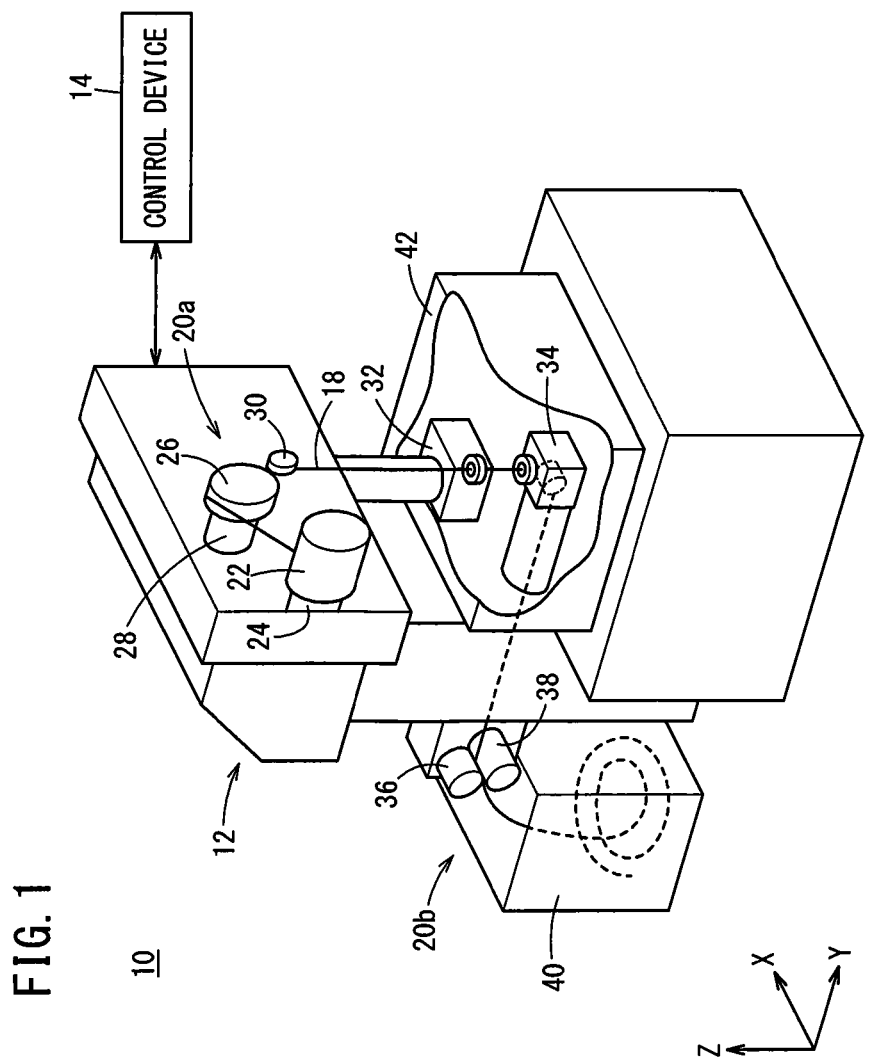
FIG. 1 is a perspective view showing an example configuration of a machine tool having a control device according to a first embodiment.

FIG. 1 is a perspective view showing an example configuration of a machine tool 10 having a control device 14 according to a first embodiment. As shown in FIG. 1, the machine tool 10 is a wire electric discharge machine, for example, and includes a main body 12 and the control device 14.

First, the main body 12 will be described. The main body 12 includes a supplying system 20a for supplying a wire electrode 18 to an object 16 to be moved (which will also be referred to as a moved object 16) (see FIG. 2), a collecting system 20b for collecting the wire electrode 18 passed through the object 16 to be moved, and a tank (pan) 42 in which a dielectric working fluid is stored.

The supplying system 20a includes a wire bobbin 22, a brake shoe 26, a brake motor 28, and an upper wire guide 32. The wire electrode 18 is wound around the wire bobbin 22 and torque is applied to the bobbin by a torque motor 24. The brake shoe 26 applies a braking force by friction to the wire electrode 18, and brake torque is applied to the brake shoe by the brake motor 28. The upper wire guide 32 is disposed in the tank 42 and guides the wire electrode 18 above the moved object 16. The supplying system 20a further includes a tension detector 30 for detecting the magnitude of tension of the wire electrode 18, and so on.

The collecting system 20b includes a lower wire guide 34, a pinch roller 36, a feed roller 38, and a wire collection box 40. The lower wire guide 34 is disposed in the tank 42 and guides the wire electrode 18 below the moved object 16. The pinch roller 36 and feed roller 38 are disposed to pinch and convey the wire electrode 18, and the conveyed wire electrode 18 is collected into the wire collection box 40. The wire electrode 18 is conveyed along a Z-axis direction with respect to the moved object 16 by the upper wire guide 32 and the lower wire guide 34.

In the machine tool 10 having the main body 12 described above, the moved object 16 is supported on a supporting portion 44 such as a table (see FIG. 2) in the working fluid in the tank 42, and a voltage is applied to the gap formed between the wire electrode 18 and the moved object 16. An electric discharge thus occurs in the working fluid and electric discharge machining is performed on the moved object 16. The supporting portion 44 is capable of moving in an X-axis direction and a Y-axis direction that cross the Z-axis direction. The moved object 16 is thus three-dimensionally machined as the supporting portion 44 moves in the X-axis direction and Y-axis direction. The upper wire guide 32 is capable of moving in a U-axis direction parallel to the X-axis direction and a V-axis direction parallel to the Y-axis direction.

Next, the control device 14 will be described below. The control device 14 is configured to control axial feed of the moved object 16 (supporting portion 44) when the axial feed operation mentioned above is performed.

Figure 2:
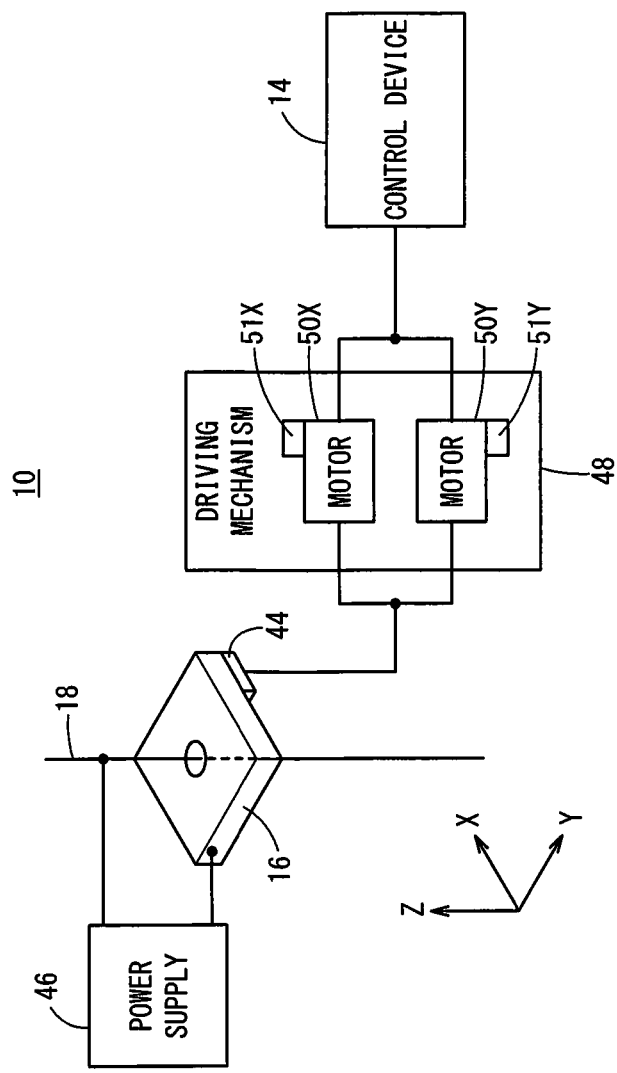
FIG. 2 is a block diagram showing a schematic configuration of the machine tool having the control device of the first embodiment.

FIG. 2 is a block diagram showing a schematic configuration of the machine tool 10 having the control device 14 of the first embodiment.

As shown in FIG. 2, a power supply 46 is connected to the wire electrode 18 and the supporting portion 44 of the machine tool 10 to apply voltage thereto. The control device 14 and the supporting portion 44 are connected to each other through a driving mechanism 48.

The driving mechanism 48 is configured to move the supporting portion 44 and includes motors 50X, 50Y for driving the supporting portion 44 respectively in the X-axis direction and the Y-axis direction on a predetermined coordinate system. That is, in this embodiment, the supporting portion 44 and the moved object 16 on the supporting portion 44 move as the motors 50X, 50Y rotate. The rotations of the motors 50X, 50Y are controlled by the control device 14. Further, the motors 50X, 50Y respectively include encoders 51X, 51Y for measuring the respective rotational angles.

The predetermined coordinate system may be a mechanical coordinate system that is determined at the designing stage of the machine tool 10 or a coordinate system in which an operator sets the origin in an arbitrary manner. In this embodiment, in order to simplify the description, the predetermined coordinate system will be explained as a mechanical coordinate system that is determined at the designing stage of the machine tool 10.

Figure 3:
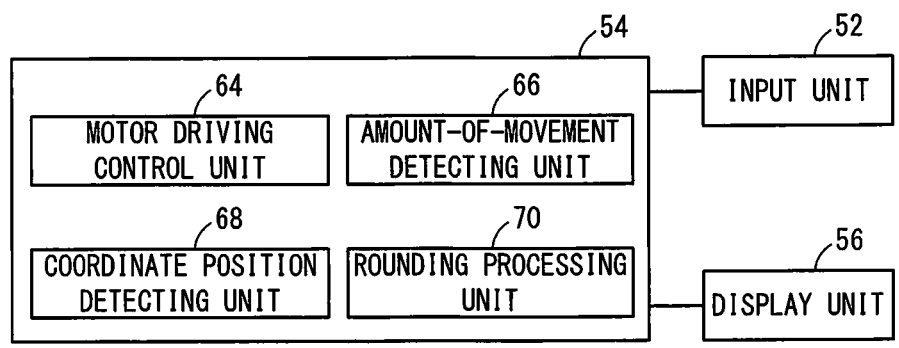
FIG. 3 is a block diagram showing a schematic configuration of the control device of the first embodiment.

FIG. 3 is a block diagram showing a schematic configuration of the control device 14 of the first embodiment. As shown in FIG. 3, the control device 14 includes an input unit 52, a control unit 54, and a display unit 56.

Figure 4:
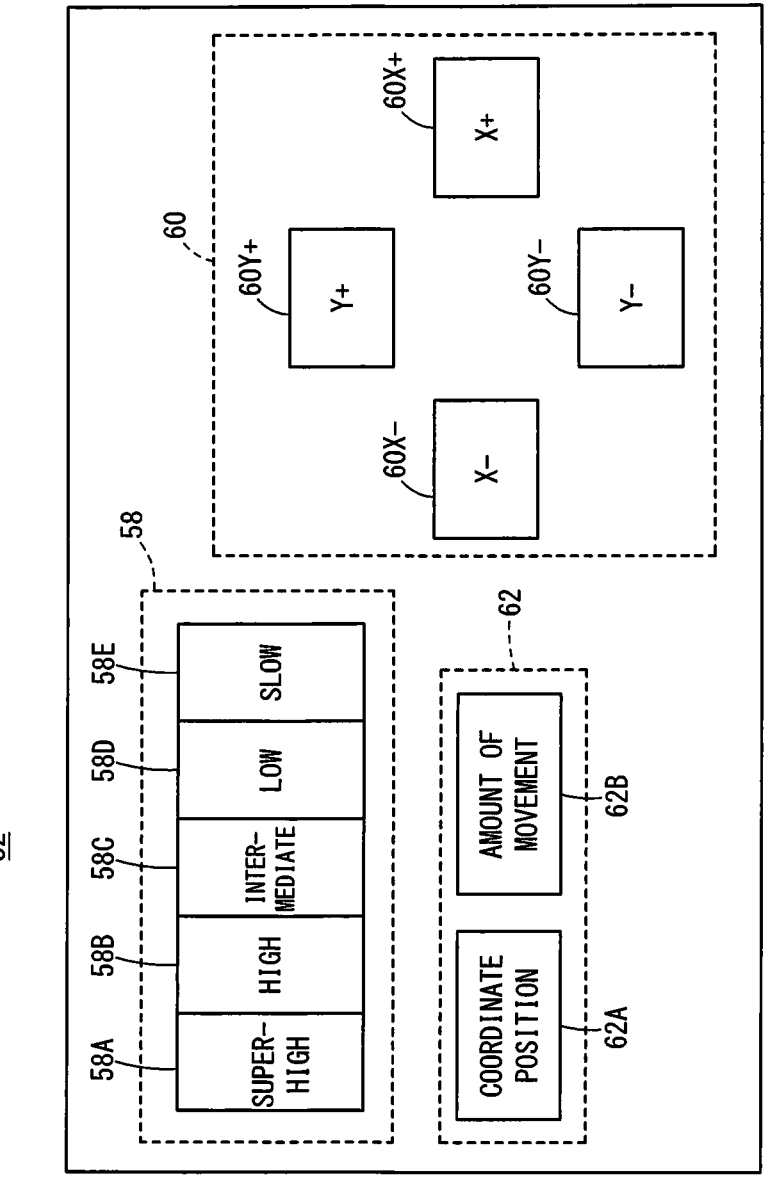
FIG. 4 is a diagram schematically showing an arrangement of operation keys on an input unit of the first embodiment.

FIG. 4 is a diagram schematically showing an example of arrangement of operation keys on the input unit 52 of the first embodiment.

The input unit 52 is an operation panel, for example, and configured to allow an operator to perform an axial feed operation and specify an axial feed rate. As shown in FIG. 4, the input unit 52 includes a plurality of rate selecting keys 58 (58A to 58E) by which the operator can specify an axial feed rate. The rate selecting key 58A corresponds to "super-high" and the rate selecting key 58B corresponds to "high". Similarly, the rate selecting keys 58C, 58D and 58E correspond to "intermediate", "low" and "slow", respectively.

The input unit 52 further includes a plurality of axial feed keys 60 (60X+, 60X−, 60Y+, 60Y−) by which the operator specifies an axial feed of the moved object 16. The operation of the axial feed keys 60X+, 60X−, 60Y+, 60Y− by the operator is referred to as an axial feed operation. For example, the operator operates the axial feed key 60X+ to move the moved object 16 (supporting portion 44) in the +X-axis direction and operates the axial feed key 60X− to move the moved object 16 in the −X-axis direction. Similarly, the operator operates the axial feed key 60Y+ to move the moved object 16 (supporting portion 44) in the +Y-axis direction and operates the axial feed key 60Y− to move the moved object 16 in the −Y-axis direction.

The input unit 52 further includes two object-to-be-rounded selecting keys 62 (62A, 62B) for allowing the operator to select either of the coordinate position and the amount of movement as an object of rounding processing that will be described later. When selecting the coordinate position as the object to be rounded (i.e., target for rounding), the operator operates the object-to-be-rounded selecting key 62A. When selecting the amount of movement as the object to be rounded, the operator operates the object-to-be-rounded selecting key 62B.

The "coordinate position" in this embodiment indicates a position at which the moved object 16 exists on the predetermined coordinate system. Further, the "amount of movement" in this embodiment indicates a distance that the moved object 16 travels on the predetermined coordinate system from the start of an axial feed operation to its stopping.

The display unit 56 is a liquid-crystal display, for example, and it displays at least the coordinate position of the moved object 16. The information displayed on the display unit 56 may be changed as needed. For example, the display unit 56 may be configured to display not only the coordinate position but also the amount of movement and the axial feed rate.

The control unit 54 includes a processor and memory (not shown) and is configured to execute programs required to control the machine tool 10. For example, when one of the rate selecting keys 58A to 58E is operated, the control unit 54 sets the axial feed rate at the rate corresponding to the operated rate selecting key 58. For example, when the rate selecting key 58A is operated, the control unit 54 sets the axial feed rate at "superhigh". While the specific rates at the respective levels may be changed appropriately, this embodiment assumes that the axial feed rate is set to be fastest when "superhigh" is specified and that the axial feed rate is set to be slowest when "slow" is specified.

As shown in FIG. 3, in this embodiment, the control unit 54 includes a motor driving control unit 64, an amount-of-movement detecting unit 66, a coordinate position detecting unit 68, and a rounding processing unit 70.

The motor driving control unit 64 is a processing unit that is configured to drive the motors 50X, 50Y to move the moved object 16 until an axial feed operation conducted by an operator is stopped, and based on the result of rounding processing, which will be described later, if the rounding processing is performed. For example, in this embodiment, when the axial feed key 60X+ is operated, the motor driving control unit 64 drives the motor 50X so that the moved object 16 moves at the set axial feed rate in the +X-axis direction until the operation is stopped (i.e., until the operation key is released). Also, when the axial feed key 60X− is operated, the motor driving control unit 64 drives the motor 50X so that the moved object 16 moves at the set axial feed rate in the −X-axis direction until the operation is released. Similarly, when the axial feed key 60Y+ or 60Y− is operated, the motor driving control unit 64 drives the motor 50Y according to the operation.

The amount-of-movement detecting unit 66 is a processing unit that is configured to detect the amount of movement of the moved object 16 in the axial feed direction. In this embodiment, the amount-of-movement detecting unit 66 detects the amount of movement of the moved object 16 in the axial feed direction based on the rotational angles of the motors 50X, 50Y measured by the encoders 51X, 51Y. When the machine tool 10 includes a sensor or the like that is capable of detecting the amount of movement of the moved object 16, the amount-of-movement detecting unit 66 does not have to employ information from the encoders 51X, 51Y.

Based on the amount of movement of the moved object 16 detected by the amount-of-movement detecting unit 66, the coordinate position detecting unit 68 detects the coordinate position of the moved object 16 in the axial feed direction. In this embodiment, the amount of movement and the coordinate position are both detected as a numerical value having four decimal places in millimeters (mm), but the unit and the number of places of the numerical values to be detected may be changed appropriately.

The rounding processing unit 70 is a processing unit that is configured to perform rounding processing for rounding at least one of the coordinate position and the amount of movement of the moved object 16 to a rounding place that corresponds to the specified axial feed rate.

In this embodiment, when the operator operates either of the object-to-be-rounded selecting keys 62A and 62B, then the corresponding one of the coordinate position and the amount of movement of the moved object 16 is set as the object to be rounded in the rounding processing unit 70, in response to the operation. The rounding processing unit 70 performs the rounding processing by rounding up a present value of at least one of the numerical values of the object to be rounded (either of the coordinate position and the amount of movement) to a rounding place in such a manner that the figures after the rounding place become zero.

The axial feed rate and the object to be rounded may be specified by an operator or may be set automatically by the control unit 54 as initial settings at startup of the machine tool 10.

Figure 5:
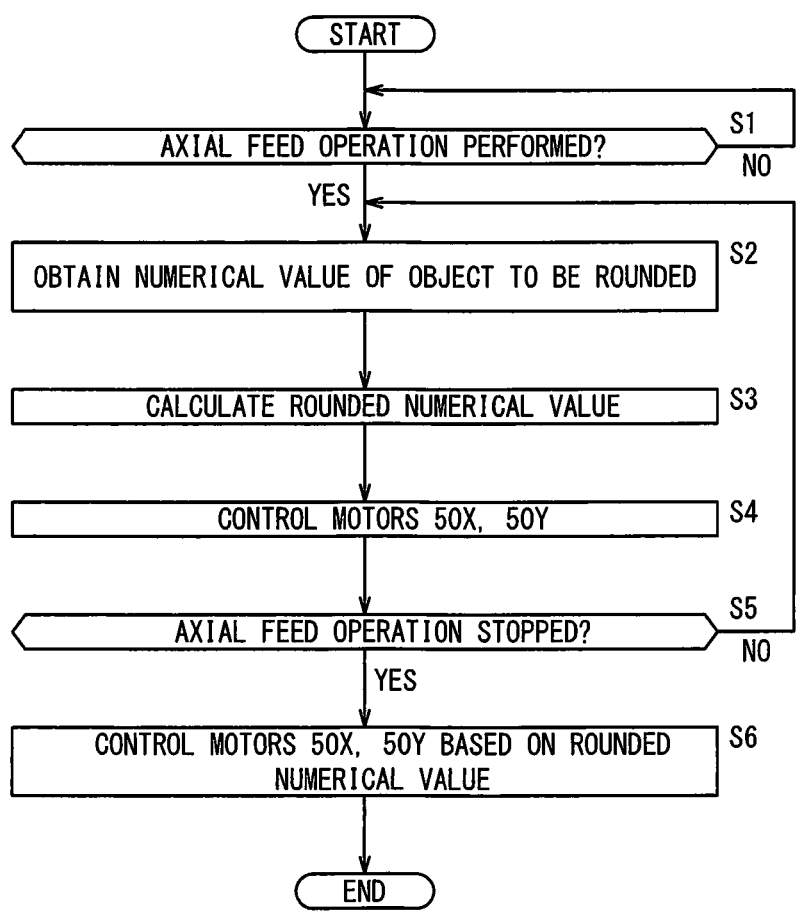
FIG. 5 is a flowchart showing the flow of a control performed by a control unit in a process in which rounding processing of the first embodiment is performed.

FIG. 5 is a flowchart showing the flow of a control performed by the control unit 54 in a process including the rounding processing.

At step S1, the control unit 54 determines whether an axial feed operation is being performed. For example, the control unit 54 determines that an axial feed operation is being performed when it receives a signal that is sent from the input unit 52 when any of the axial feed keys 60X+ to 60Y− is operated. Then, if the control unit 54 determines that an axial feed operation is being performed, it executes steps S2 and S3.

At step S2, the rounding processing unit 70 obtains the numerical value of the object to be rounded. For example, when the object to be rounded is "coordinate position", then the rounding processing unit 70 obtains the coordinate position in the axial feed direction of the moved object 16 at that point of time from the coordinate position detecting unit 68. Step S2 is thus completed.

FIG. 6 is a correspondence table showing an example of the relation between axial feed rates and rounding places that is stored in the memory of the control unit 54.

At step S3, the rounding processing unit 70 calculates a rounded numerical value. First, the rounding processing unit 70 refers to the correspondence relation between the axial feed rates and the rounding places stored in the memory to thereby determine the rounding place corresponding to the specified axial feed rate. For example, suppose that the axial feed rates and the rounding places are in the correspondence relation shown in FIG. 6 and the axial feed rate specified by the operator is "superhigh". In this case, the rounding processing unit 70 determines that the rounding place is "the ones place" (in millimeters) (mm).

Next, the rounding processing unit 70 rounds the numerical value obtained as the object to be rounded, to the rounding place to thereby obtain the rounded numerical value. For example, suppose that the coordinate position obtained at step S2 is "(X-axis direction) 0.1234 (mm)". Then, if the object to be rounded is "coordinate position" and the rounding place is "the ones place", then the rounding processing unit 70 rounds up the present value to the ones place to thereby obtain the rounded numerical value "(X-axis direction) 1.0000 (mm)". After calculating the rounded numerical value, the rounding processing unit 70 stores the calculated result into the memory. Step S3 is thus completed.

Step S4 is a step in which the motor driving control unit 64 controls the motors 50X, 50Y. At step S4, the moved object 16 moves on the coordinate system according to the axial feed operation performed by the operator.

At step S5, the control unit 54 determines whether the axial feed operation has been released. For example, the control unit 54 determines that the axial feed operation has been released if transmission of a signal that is sent from the input unit 52 to the control unit 54 only while any of the axial feed keys 60X+ to 60Y− is being operated is halted. The control unit 54 repeatedly executes steps S2 to S4 unless it determines that the axial feed operation has been released. That is, in this embodiment, the rounding processing is performed every time the coordinate position and the amount of movement vary, and the rounded numerical value stored in the memory is kept updated repeatedly.

When step S5 determines that the axial feed operation has been released, the control unit 54 executes step S6. At step S6, the motor driving control unit 64 controls the motors 50X, 50Y based on the latest rounded numerical value stored in the memory. For example, suppose the object to be rounded is "coordinate position", the rounding place is "the ones place", and the latest rounded numerical value is "(X-axis direction) 200.0000 (mm)". In this case, the motor driving control unit 64 automatically controls the motor 50X so that the "coordinate position" of the moved object 16 shifts to "200.0000 (mm)".

The control unit 54 provides the control as described above when rounding processing is conducted.

The example above shows a process in which the "coordinate position" is rounded, but the "amount of movement" detected by the amount-of-movement detecting unit 66 may be rounded. For example, when the object to be rounded is "the amount of movement", the rounding place is "the ones place", and the amount of movement is "(+Y-axis direction) 1.0001 (mm)", then the rounded numerical value is stored in the memory as "(+Y-axis direction) 2.0000 (mm)".

According to the control device 14 of the first embodiment described above, after the axial feed operation has been released, the motors 50X, 50Y are automatically controlled so as to achieve the coordinate position or the amount of movement indicated by the rounded numerical value calculated during the axial feed operation. Thus, the variation of the stopping position and the amount of movement of the moved object 16, which occurs during the axial feed operation by the operator, is automatically reduced after the axial feed operation. Furthermore, the rounded numerical value is calculated during the axial feed operation. Accordingly, the control device 14 of the first embodiment shifts to the automatic control based on the rounded numerical value immediately after the control of the motors 50X, 50Y according to the axial feed operation has been stopped.

In the first embodiment, the rounding place is determined to be a higher-digit position as the axial feed rate specified by the operator is faster. In the axial feed operation, the error between the desired stopping position and the actual stopping position is likely to be larger as the axial feed rate is faster. However, according to the control device 14 of the first embodiment, the error between the desired stopping position and the actual stopping position of the moved object 16 can be rounded to a value corresponding to the axial feed rate.

In the first embodiment, numerical values are rounded up to the rounding place to calculate the rounded numerical values. Consequently, when moving based on the result of rounding, the moved object 16 moves in the same direction as the axial feed direction instructed by the operator. Therefore, it is possible to prevent the moved object 16 from going back to a coordinate position that the moved object 16 once passed.

Modifications

The first embodiment has been described so far as an example of the present invention, and it is of course possible to apply various modifications or improvements to the first embodiment. It is clear from the recitation of claims that such variously modified or improved embodiments are included in the technical scope of the present invention.

First Modification

In the first embodiment, the rounding processing is performed every time the coordinate position and the amount of movement vary. The rounding processing need not necessarily be performed every time the coordinate position and the amount of movement vary, as long as it is performed repeatedly. For example, the rounding processing unit 70 may be configured to perform the rounding processing only at points of time (timing) when the figure located at the rounding place in the rounded numerical value is updated.

A specific example will be described in which the rounding processing on the coordinate position is performed by rounding up the value to the rounding place. In this example, the rounding place is assumed to be "the ones place". In such an example, while the coordinate position is in the range of "(X-axis direction) 200.0001 to 201.0000 (mm)", the result is "201.0000 (mm)" whenever the rounding processing is conducted. In this example, the timing by which the figure located at the rounding place in the rounded numerical value is updated is the timing at which the result of rounding becomes "202.0000 (mm)". In other words, the timing of updating of the figure located at the rounding place in the rounded numerical value is the time when the coordinate position of the moved object 16 has exceeded the last-calculated rounded numerical value (in this example, "201.0000 (mm)". Accordingly, the rounding processing unit 70 may be configured to execute the rounding processing only when the coordinate position of the moved object 16 has exceeded the last-calculated rounded numerical value. This reduces the frequency of execution of the rounding processing. As a result, it is possible to reduce the processing loads on the rounding processing unit 70.

Second Modification

The rounding processing unit 70 may be configured to perform the rounding processing by rounding down at least one of the coordinate position and the amount of movement of the moved object 16 to the rounding place in such a manner that the figures after the rounding place become zero.

In this case, when moving based on the result of rounding processing, the moved object 16 moves in the opposite direction to the axial feed direction instructed by the operator. That is to say, this prevents the moved object 16 from advancing more than needed along the axial feed direction on the coordinate system. As in the first modification, the rounding processing unit 70 may be configured to execute the rounding processing only when the figure located at the rounding place is updated in the rounded numerical value.

The timing is for example when the figure located at the rounding place in the present value to be rounded is updated.

Third Modification

The rounding processing unit 70 may be configured to perform the rounding processing by rounding in a round half up manner at least one of the coordinate position and the amount of movement of the moved object 16 to the rounding place in such a manner that the figures after the rounding place become zero.

In this case, when moving based on the result of the rounding processing, the moved object 16 is likely to travel a smaller amount of movement. As in the first and second modifications, the rounding processing unit 70 may be configured to execute the rounding processing only when the figure located at the rounding place in the rounded numerical value is updated. The timing is, for example, when the figure located to the right of (i.e., located immediately after) the rounding place in the present value of the object to be rounded becomes "5".

Fourth Modification

A fourth modification explains an example in which, when the object to be rounded is "the amount of movement", the "amount of movement" is rounded by using numerical values of the "coordinate position".

The rounding processing unit 70 may be configured to round the amount of movement by adding the figures after the rounding place in the coordinate position of the moved object 16 in the axial feed direction at the time of the start of the axial feed operation, to the present value of the coordinate position of the moved object 16 that has been rounded in such a manner that the figures after the rounding place become zero.

A specific example is explained. For example, at the time of the start of the axial feed operation, the rounding processing unit 70 stores information about the coordinate position of the moved object 16 at this time into the memory. Here, it is assumed that the axial feed operation has been done in the +X-axis direction and the information stored in the memory is "(X-axis direction) 0.1234 (mm)".

Next, the rounding processing unit 70 calculates the numerical value by rounding the present value of the coordinate position to the rounding place. The method of rounding is not particularly limited, but it is assumed here that the value is rounded up to the rounding place and the present value is "0.9000 (mm)". Accordingly, when the rounding place is "the ones place", then the result of rounding of "0.9000 (mm)" is "1.0000 (mm)".

Next, the rounding processing unit 70 adds the above two numerical values together. That is, it adds "0.1234 (mm)" and "1.0000 (mm)" to obtain "1.1234 (mm)". Then, even when the axial feed operation is released at the coordinate position "0.9000 (mm)" in the X-axis direction, the moved object 16 is automatically moved to the coordinate position "1.1234 (mm)" in the X-axis direction (the amount of movement "1.0000 (mm)").

In this way, the rounding processing unit 70 may be configured to perform the processing for rounding "the amount of movement" by using numerical values of the "coordinate position". The variation in the amount of movement of the moved object 16 occurring during the axial feed operation performed by the operator is automatically reduced after the axial feed operation.

Fifth Modification

The rounding processing unit 70 may be configured to perform the rounding processing for rounding the amount of movement by subtracting the figures after the rounding place in the amount of movement of the moved object 16 from the numerical value of the coordinate position of the moved object 16.

A specific example will be explained. For example, in an axial feed operation starting at the coordinate position "(X-axis direction) 0.2468 (mm)", the rounding processing unit 70 obtains the coordinate position and the amount of movement of the moved object 16 at this time in the axial feed direction. It is assumed here that the coordinate position obtained is "(X-axis direction) 201.1234 (mm)" and the amount of movement obtained is "(X-axis direction) 200.8766 (mm)". The amount of movement obtained at this time may be detected by the amount-of-movement detecting unit 66, or may be calculated by the rounding processing unit 70 based on the difference between the coordinate position at the starting of the axial feed operation and the coordinate position at the starting of the rounding processing.

Next, the rounding processing unit 70 subtracts the figures after the rounding place in the present value of the amount of movement of the moved object 16 from the present value of the coordinate position of the moved object 16. When the rounding place is "the ones place", then the rounding processing unit 70 subtracts "0.8766 (mm)" from "201.1234 (mm)" to obtain "200.2468 (mm)".

Then, even when the axial feed operation is released at the coordinate position "201.1234 (mm)" in the X-axis direction, for example, the moved object 16 is automatically moved to the coordinate position "200.2468 (mm)" in the X-axis direction (the amount of movement "200.0000" (mm)".

The rounding processing unit 70 may be configured to execute the processing for rounding "the amount of movement" as described above. It is then possible to automatically reduce, after the axial feed operation, the variation in the amount of movement of the moved object 16 occurring during the axial feed operation performed by the operator.

Sixth Modification

The object to be subjected to the rounding processing and to be controlled based on the rounding result is not limited to the supporting portion 44. For example, the control device 14 may be configured to perform the rounding processing when the upper wire guide 32 is axially fed along any of the V-axis, U-axis and Z-axis and to move the upper wire guide 32 based on the result. Further, the lower wire guide 34 may be controlled in the same manner as the upper wire guide 32.

Seventh Modification

The machine tool 10 to which the control device 14 is applied is not limited to wire electric discharge machines as long as the machine tools are equipped with axial feed operation. For example, the machine tool 10 may be an injection molding machine and the control device 14 may perform the rounding processing when an object 16 to be moved is axially fed in the injection molding machine.

Eighth Modification

The embodiment and modifications described above may be combined together in an arbitrary manner within ranges where no contradiction occurs.

Invention Obtained from Embodiments

The invention that can be grasped from the embodiments and modifications above will be recited below.

First Invention

A first invention is directed to the control device (14) configured to control a motor (50X, 50Y) for performing axial feed of a moved object (16). The control device (14) includes: an input unit (52) configured to allow an operator to perform an axial feed operation and specify an axial feed rate; a motor driving control unit (64) configured to drive the motor (50X, 50Y) such that the moved object (16) moves at the specified axial feed rate only while the axial feed operation is being performed by the operator; an amount-of-movement detecting unit (66) configured to detect an amount of movement of the moved object (16) in an axial feed direction; a coordinate position detecting unit (68) configured to detect, based on the amount of movement, a coordinate position of the moved object (16) in the axial feed direction on a predetermined coordinate system; a display unit (56) configured to display at least the coordinate position; and a rounding processing unit (70) configured to repeatedly perform rounding processing for rounding at least one of the coordinate position and the amount of movement of the moved object (16) to a rounding place corresponding to the specified axial feed rate while the axial feed operation is being performed. The motor driving control unit (64) is further configured to, after the axial feed operation is stopped, drive the motor (50X, 50Y) such that at least one of the coordinate position and the amount of movement of the moved object (16) is rounded based on a result of the rounding processing that was performed last.

Thus, variation in the stopping position and the amount of movement of the moved object (16) occurring during the axial feed operation by the operator is automatically reduced after the axial feed operation.

The rounding processing unit (70) may be configured to perform the rounding processing every time the coordinate position and the amount of movement vary. The rounded numerical value is thus kept updated repeatedly during the axial feed operation.

The rounding processing unit (70) may be configured to perform the rounding processing by rounding up a numerical value of at least one of the coordinate position and the amount of movement of the moved object (16) to the rounding place such that figures after the rounding place become zero. With this configuration, even when the moved object (16) moves based on the result of the rounding processing, it moves in the same direction as the axial feed direction instructed by the operator. That is, the moved object (16) is prevented from going back to a coordinate position that it once passed.

The rounding processing unit (70) may be configured to perform the rounding processing by rounding down a numerical value of at least one of the coordinate position and the amount of movement of the moved object (16) to the rounding place such that figures after the rounding place become zero. With this configuration, when the moved object (16) moves based on the result of the rounding processing, it moves in the opposite direction to the axial feed direction instructed by the operator. That is, the moved object (16) is prevented from advancing more than needed along the axial feed direction on the coordinate system.

The rounding processing unit (70) may be configured to perform the rounding processing by rounding in a round half up manner a numerical value of at least one of the coordinate position and the amount of movement of the moved object (16) to the rounding place such that figures after the rounding place become zero. Owing thereto, when the moved object (16) moves based on the result of the rounding processing, the amount of movement is likely to be smaller.

The rounding processing unit (70) may be configured to perform the rounding processing for rounding the amount of movement by adding figures after the rounding place of the coordinate position of the moved object (16) in the axial feed direction at a time when the axial feed operation was started, to a numerical value obtained by rounding a present value of the coordinate position of the moved object (16) such that figures after the rounding place become zero. Owing to this, variation in the amount of movement of the moved object (16) occurring during the axial feed operation performed by the operator is automatically reduced after the axial feed operation.

The rounding processing unit (70) may be configured to perform the rounding processing for rounding the amount of movement by subtracting figures after the rounding place in a numerical value of the amount of movement of the moved object (16) from a numerical value of the coordinate position of the moved object (16). With this configuration, variation in the amount of movement of the moved object (16) occurring during the axial feed operation by the operator is automatically reduced after the axial feed operation.

Second Invention

According to a second invention, an axial feed control method includes the steps of: setting either of a coordinate position and an amount of movement of a moved object (16) as an object of rounding processing; in accordance with specifying of an axial feed rate and performing of an axial feed operation by an operator, driving a motor (50X, 50Y) such that the moved object (16) moves on a coordinate system at the specified axial feed rate; determining a rounding place corresponding to the axial feed rate based on a predetermined correspondence relation; during the axial feed operation, obtaining a numerical value of the object of the rounding processing; during the axial feed operation, repeatedly performing the rounding processing to calculate a rounded numerical value by rounding the numerical value of the object of the rounding processing to the rounding place; and after the axial feed operation is stopped, driving the motor (50X, 50Y) such that an actual numerical value of the object of the rounding processing agrees with the rounded numerical value that was calculated last.

Thus, variation in the stopping position and the amount of movement of the moved object (16) occurring during the axial feed operation by the operator is automatically reduced after the axial feed operation.

The rounding processing may be performed every time the coordinate position and the amount of movement vary. Then, the rounded numerical value is kept repeatedly updated during the axial feed operation.

In the rounding processing, the rounded numerical value may be calculated by rounding up the numerical value of the object of the rounding processing to the rounding place such that figures after the rounding place become zero. With this configuration, even when the moved object (16) moves based on the result of the rounding processing, it moves in the same direction as the axial feed direction instructed by the operator. That is, the moved object (16) is prevented from going back to a coordinate position that it once passed.

In the rounding processing, the rounded numerical value may be calculated by rounding down the numerical value of the object of the rounding processing to the rounding place such that figures after the rounding place become zero. Owing thereto, when the moved object (16) moves based on the result of the rounding processing, it moves in the opposite direction to the axial feed direction instructed by the operator. That is, the moved object (16) is prevented from advancing more than needed along the axial feed direction on the coordinate system.

In the rounding processing, the rounded numerical value may be calculated by rounding in a round half up manner the numerical value of the object of the rounding processing to the rounding place such that figures after the rounding place become zero. Then, when the moved object (16) moves based on the result of the rounding processing, the amount of movement is likely to be smaller.

In the rounding processing, the amount of movement may be rounded by adding figures after the rounding place of the coordinate position of the moved object (16) in the axial feed direction at a time when the axial feed operation was started, to a numerical value obtained by rounding a present value of the coordinate position of the moved object (16) such that figures after the rounding place become zero. With this configuration, variation in the amount of movement of the moved object (16) occurring during the axial feed operation by the operator is automatically reduced after the axial feed operation.

In the rounding processing, the amount of movement may be rounded by subtracting figures after the rounding place in a numerical value of the amount of movement of the moved object (16) from a numerical value of the coordinate position of the moved object (16). Then, variation in the amount of movement of the moved object (16) occurring during the axial feed operation by the operator is automatically reduced after the axial feed operation.

The present invention is not particularly limited to the embodiment described above, and various modifications are possible without departing from the essence and gist of the present invention.

What is claimed is:

1. A control device configured to control a motor for performing axial feed of a moved object, comprising:
   an operation panel configured to allow an operator to perform an axial feed operation and specify an axial feed rate;
   a processor configured to drive the motor so that the moved object moves at the specified axial feed rate only while the axial feed operation is being performed by the operator;
   an amount-of-movement detecting unit to detect an amount of movement of the moved object in an axial feed direction based on an output signal of a sensor;
   a coordinate position detecting unit to detect, based on the amount of movement, a coordinate position of the moved object in the axial feed direction on a predetermined coordinate system;
   wherein the processor is further configured to:
   display at least the coordinate position in a display;
   repeatedly perform rounding processing for rounding at least one of the coordinate position or the amount of movement of the moved object to a rounding place corresponding to the specified axial feed rate while the axial feed operation is being performed; and
   after the axial feed operation is stopped, drive the motor so that at least one of the coordinate position or the amount of movement of the moved object is rounded based on a result of the rounding processing that was performed last.

2. The control device according to claim 1, wherein the processor is configured to perform the rounding processing every time the coordinate position and the amount of movement vary.

3. The control device according to claim 1, wherein the processor is configured to perform the rounding processing by rounding up a numerical value of at least one of the coordinate position or the amount of movement of the moved object to the rounding place so that figures after the rounding place become zero.

4. The control device according to claim 1, wherein the processor is configured to perform the rounding processing by rounding down a numerical value of at least one of the coordinate position or the amount of movement of the moved object to the rounding place so that figures after the rounding place become zero.

5. The control device according to claim 1, wherein the processor is configured to perform the rounding processing by rounding in a round half up manner a numerical value of at least one of the coordinate position or the amount of movement of the moved object to the rounding place so that figures after the rounding place become zero.

6. The control device according to claim 1, wherein the processor is configured to perform the rounding processing for rounding the amount of movement by adding figures after the rounding place of the coordinate position of the moved object in the axial feed direction at a time when the axial feed operation was started, to a numerical value obtained by rounding a present value of the coordinate position of the moved object so that figures after the rounding place become zero.

7. The control device according to claim 1, wherein the processor is configured to perform the rounding processing for rounding the amount of movement by subtracting figures after the rounding place in a numerical value of the amount of movement of the moved object from a numerical value of the coordinate position of the moved object.

8. An axial feed control method comprising the steps of:
   setting either of a coordinate position or an amount of movement of a moved object as an object of rounding processing;
   in accordance with specifying of an axial feed rate and performing of an axial feed operation by an operator, driving a motor so that the moved object moves on a coordinate system at the specified axial feed rate;
   determining a rounding place corresponding to the axial feed rate based on a predetermined correspondence relation;
   during the axial feed operation, obtaining a numerical value of the object of the rounding processing;
   during the axial feed operation, repeatedly performing the rounding processing to calculate a rounded numerical value by rounding the numerical value of the object of the rounding processing to the rounding place; and
   after the axial feed operation is stopped, driving the motor so that an actual numerical value of the object of the rounding processing agrees with the rounded numerical value that was calculated last.

9. The axial feed control method according to claim 8, wherein the rounding processing is performed every time the coordinate position and the amount of movement vary.

10. The axial feed control method according to claim 8, wherein, in the rounding processing, the rounded numerical value is calculated by rounding up the numerical value of the object of the rounding processing to the rounding place so that figures after the rounding place become zero.

11. The axial feed control method according to claim 8, wherein, in the rounding processing, the rounded numerical value is calculated by rounding down the numerical value of the object of the rounding processing to the rounding place so that figures after the rounding place become zero.

12. The axial feed control method according to claim 8, wherein, in the rounding processing, the rounded numerical value is calculated by rounding in a round half up manner the numerical value of the object of the rounding processing to the rounding place so that figures after the rounding place become zero.

13. The axial feed control method according to claim 8, wherein, in the rounding processing, the amount of movement is rounded by adding figures after the rounding place of the coordinate position of the moved object in the axial feed direction at a time when the axial feed operation was started, to a numerical value obtained by rounding a present value of the coordinate position of the moved object so that figures after the rounding place become zero.

14. The axial feed control method according to claim 8, wherein, in the rounding processing, the amount of movement is rounded by subtracting figures after the rounding place in a numerical value of the amount of movement of the moved object from a numerical value of the coordinate position of the moved object.

\* \* \* \* \*